United States Patent
Chang (10) Patent No.: US 7,918,241 B1
(45) Date of Patent: Apr. 5, 2011

(54) MIXED WATER CONTROL VALVE HAVING A WATER PRESSURE BALANCE FUNCTION TO STABILIZE A WATER TEMPERATURE

(75) Inventor: Chia-Po Chang, Lugang Township, Changhua County (TW)

(73) Assignee: Hain Yo Enterprises Co., Ltd., Ho-Mei Town (TW)

( * ) Notice: Subject to any disclaimer, the term of this patent is extended or adjusted under 35 U.S.C. 154(b) by 673 days.

(21) Appl. No.: 11/950,654

(22) Filed: Dec. 5, 2007

(51) Int. Cl.
F16K 11/16 (2006.01)

(52) U.S. Cl. ............... 137/98; 137/315.09; 137/607; 137/625.41

(58) Field of Classification Search ........... 137/602, 137/603, 605, 606, 607, 896, 898, 895, 98, 137/100, 315.09, 625.41, 625.47
See application file for complete search history.

(56) References Cited

U.S. PATENT DOCUMENTS

| | | | | |
|---|---|---|---|---|
| 4,901,750 A * | 2/1990 | Nicklas et al. | ............... | 137/270 |
| 4,957,137 A * | 9/1990 | Wang | ............... | 137/549 |
| 5,052,438 A * | 10/1991 | Wang | ............... | 137/607 |
| 5,067,513 A * | 11/1991 | Nicklas et al. | ............... | 137/98 |
| 5,355,906 A * | 10/1994 | Marty et al. | ............... | 137/98 |
| 5,390,690 A * | 2/1995 | Blaga | ............... | 137/1 |
| 5,425,394 A * | 6/1995 | Clare | ............... | 137/270 |
| 5,441,075 A * | 8/1995 | Clare | ............... | 137/454.6 |
| 5,664,598 A * | 9/1997 | Shieh | ............... | 137/100 |
| 5,884,652 A * | 3/1999 | Yeh et al. | ............... | 137/98 |
| 5,884,653 A * | 3/1999 | Orlandi | ............... | 137/100 |
| 5,983,918 A * | 11/1999 | Chang | ............... | 137/98 |
| 6,012,476 A * | 1/2000 | Ko | ............... | 137/98 |
| 6,095,176 A * | 8/2000 | Yang | ............... | 137/98 |
| 6,981,693 B1 * | 1/2006 | Chang | ............... | 251/368 |

* cited by examiner

*Primary Examiner* — Stephen M Hepperle
*Assistant Examiner* — William McCalister
(74) *Attorney, Agent, or Firm* — Alan Kamrath; Kamrath & Associates PA (57) ABSTRACT

A control valve for a faucet includes a valve housing, a hollow valve seat, two sealing gaskets, at least one water outlet channel, a rotation plate, a control unit, two mounting seats, a fixed sleeve, and a movable sleeve. Thus, the movable sleeve is movable in the fixed sleeve to control the water flow rate of the mixed cold and hot water to the optimum value to regulate and stabilize the water pressure automatically so as to provide a pressure balance effect so that the mixed water flowing from the water outlet channel is kept at a constant temperature, thereby providing a comfortable sensation to a user.

11 Claims, 9 Drawing Sheets

MIXED WATER CONTROL VALVE HAVING A WATER PRESSURE BALANCE FUNCTION TO STABILIZE A WATER TEMPERATURE

BACKGROUND OF THE INVENTION

1. Field of the Invention

The present invention relates to a control valve and, more particularly, to a mixed water control valve for a faucet to control the temperature of a mixture of cold and hot water of the faucet.

2. Description of the Related Art

A conventional faucet comprises a control valve to mix the cold water from a cold water source and the hot water from a hot water source and to inject the mixed water outwardly for use with a user. Thus, the mixed water has a proper temperature so that the user can use the water comfortably. However, when the water flow from the cold water source or the hot water source is reduced or stops accidentally due to an irregular condition, the water pressure of the cold and hot water is not balanced, so that the water temperature is increased or decreasing to an excessive extent instantaneously to make the water too hot or too cold, thereby easily causing an uncomfortable sensation to the user due to the too cold water or evenly causing danger to the user due to the too hot water (the user is easily scalded by the too hot water).

BRIEF SUMMARY OF THE INVENTION

The primary objective of the present invention is to provide a mixed water control valve having a water pressure balance function to stabilize a water temperature of a water faucet.

Another objective of the present invention is to provide a control valve for a faucet, wherein the movable sleeve is movable in the fixed sleeve to control the water flow rate of the mixed cold and hot water to the optimum value to regulate and stabilize the water pressure automatically so as to provide a pressure balance effect so that the mixed water flowing from the water outlet channel is kept at a constant temperature, thereby providing a comfortable sensation to a user.

A further objective of the present invention is to provide a control valve for a faucet, wherein the two mounting seats, the fixed sleeve and the movable sleeve are fully hidden in the valve housing so that the water faucet directly has a water pressure balance function without having to provide a pressure stabilizer additionally to stabilize the water pressure, thereby greatly decreasing the cost.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-7, a control valve for a faucet in accordance with the preferred embodiment of the present invention comprises a valve housing 40 having an inner wall 45 provided with a receiving chamber 41, a hollow valve seat 42 mounted in the valve housing 40 and having a top wall provided with two mounting holes 421 each connected to the receiving chamber 41 of the valve housing 40, two sealing gaskets 30 mounted in the two mounting holes 421 of the valve seat 42 respectively and each having an inner wall provided with a water conduit 301 connected to the receiving chamber 41 of the valve housing 40, at least one water outlet channel 43 formed between the inner wall 45 of the valve housing 40 and an outer wall 46 of the valve seat 42 and connected to the receiving chamber 41 of the valve housing 40, a rotation plate 21 rotatably mounted in the valve housing 40 and provided with two regulating slots 211 that are movable to align with the water conduits 301 of the two sealing gaskets 30 to connect the water conduits 301 of the two sealing gaskets 30 to the receiving chamber 41 of the valve housing 40 respectively, a control unit 10 rotatably mounted on the valve housing 40 and secured to the rotation plate 21 to drive and rotate the rotation plate 21, two mounting seats 50 mounted in the valve seat 42 and each having a lower end provided with a water inlet hole 52 connected to one of a cold water source (not shown) and a hot water source (not shown) respectively and an upper end provided with a water outlet hole 53 connected to the water conduit 301 of a respective one of the two sealing gaskets 30, a fixed sleeve 60 secured in the two mounting seats 50 and provided with two connecting grooves 62 each connected between the water inlet hole 52 and the water outlet hole 53 of a respective one of the two mounting seats 50, and a movable sleeve 70 movably mounted in the fixed sleeve 60 and provided with two connecting slots 71 each movable to align with a respective one of the two connecting grooves 62 and two sealing flanges 73 each movable to align with a respective one of the two connecting grooves 62 to partially block or entirely interrupt a connection between the water inlet hole 52 and the water outlet hole 53 of a respective one of the two mounting seats 50.

The control valve further comprises two elastic members 31 each mounted between the water conduit 301 of a respective one of the two sealing gaskets 30 and the water outlet hole 53 of a respective one of the two mounting seats 50 to push the respective sealing gasket 30 toward the rotation plate 21. The water conduit 301 of each of the two sealing gaskets 30 has a stepped shape to limit the respective elastic member 31.

The valve housing 40 has a top provided with a protrusion 401. The valve seat 42 has an oblong shape and partially protrudes outwardly from a lower portion of the receiving chamber 41 of the valve housing 40.

The rotation plate 21 abuts a top of each of the two sealing gaskets 30 to isolate the water conduits 301 of the two sealing gaskets 30 from the receiving chamber 41 of the valve housing 40 and is rotatable relative to each of the two sealing gaskets 30. Each of the two regulating slots 211 of the rotation plate 21 has a horn shape and has a size increased gradually from one end to the other end of each of the two regulating slots 211. The two regulating slots 211 of the rotation plate 21 are directed toward two different directions. The rotation plate 21 has a top provided with a protruding mounting tube 22 located between the two regulating slots 211.

A resting plate 23 is secured on a bottom of the rotation plate 21 to rotate therewith and provided with two mating slots 231 aligning with the two regulating slots 211 of the rotation plate 21 respectively. Each of the two mating slots 231 of the resting plate 23 has a shape corresponding to that of each of the two regulating slots 211 of the rotation plate 21. The resting plate 23 abuts a top of each of the two sealing gaskets 30 to isolate the water conduits 301 of the two sealing gaskets 30 from the receiving chamber 41 of the valve housing 40 and is rotatable relative to each of the two sealing gaskets 30.

The control unit 10 includes a valve cover 11 mounted on the top of the valve housing 40 to cover the rotation plate 21, a control shank 12 rotatably mounted on the valve cover 11 and having a lower end extending through the valve cover 11 and inserted into the mounting tube 22 to rotate the rotation plate 21, and a micro-adjustment device 13 mounted on the valve cover 11 and co-operating with the control shank 12. The valve cover 11 of the control unit 10 has a periphery provided with an opening 111 secured on the protrusion 401 of the valve housing 40 to secure the valve cover 11 on the valve housing 40.

The two mounting seats 50 are juxtaposed to each other. The water outlet hole 53 of each of the mounting seats 50 has a stepped shape to limit the respective elastic member 31. Each of the two mounting seats 50 has a side provided with a mounting chamber 51 connected between the water inlet hole 52 and the water outlet hole 53. The mounting chambers 51 of the two mounting seats 50 face and are connected to each other. Each of the two mounting seats 50 has a periphery provided with a plurality of locking tenons 55 and a plurality of locking bores 56 so that the two mounting seats 50 are combined together by the locking tenons 55 and the locking bores 56. Each of the water inlet hole 52 and the water outlet hole 53 of each of the two mounting seats 50 has an outer wall provided with an O-ring 54 to provide a sealing effect.

The fixed sleeve 60 is secured in the mounting chambers 51 of the two mounting seats 50. The fixed sleeve 60 has an inside provided with a receiving hole 61 connected to the two connecting grooves 62 to receive the movable sleeve 70. Each of the two connecting grooves 62 has an annular shape and is formed in a peripheral wall of the fixed sleeve 60.

The movable sleeve 70 is movable in the receiving hole 61 of the fixed sleeve 60. Each of the two connecting slots 71 has an annular shape and is formed in a peripheral wall of the movable sleeve 70, and each of the two sealing flanges 73 has an annular shape and is formed in the peripheral wall of the movable sleeve 70. The two connecting slots 71 of the movable sleeve 70 are located between the two sealing flanges 73.

In operation, the cold water from the cold water source and the hot water from the hot water source initially flow into the water inlet holes 52 of the two mounting seats 50 respectively. At this time, the rotation plate 21 is rotated by the control unit 10, and the two regulating slots 211 of the rotation plate 21 are movable to align with the water conduits 301 of the two sealing gaskets 30 to connect the water conduits 301 of the two sealing gaskets 30 to the receiving chamber 41 of the valve housing 40 respectively. In such a manner, the water from the water inlet hole 52 of each of the two mounting seats 50 in turn flows through a respective one of the two connecting grooves 62 of the fixed sleeve 60, a respective one of the two connecting slots 71 of the movable sleeve 70, the respective water outlet hole 53, the water conduit 301 of a respective one of the two sealing gaskets 30 and a respective one of the two regulating slots 211 of the rotation plate 21 into the receiving chamber 41 of the valve housing 40. At this time, the cold water and the hot water are mixed in the receiving chamber 41 of the valve housing 40. Then, the mixed water flows through the water outlet channel 43 and is injected from the valve housing 40 and the valve seat 42 for use with a user.

Figure 1:
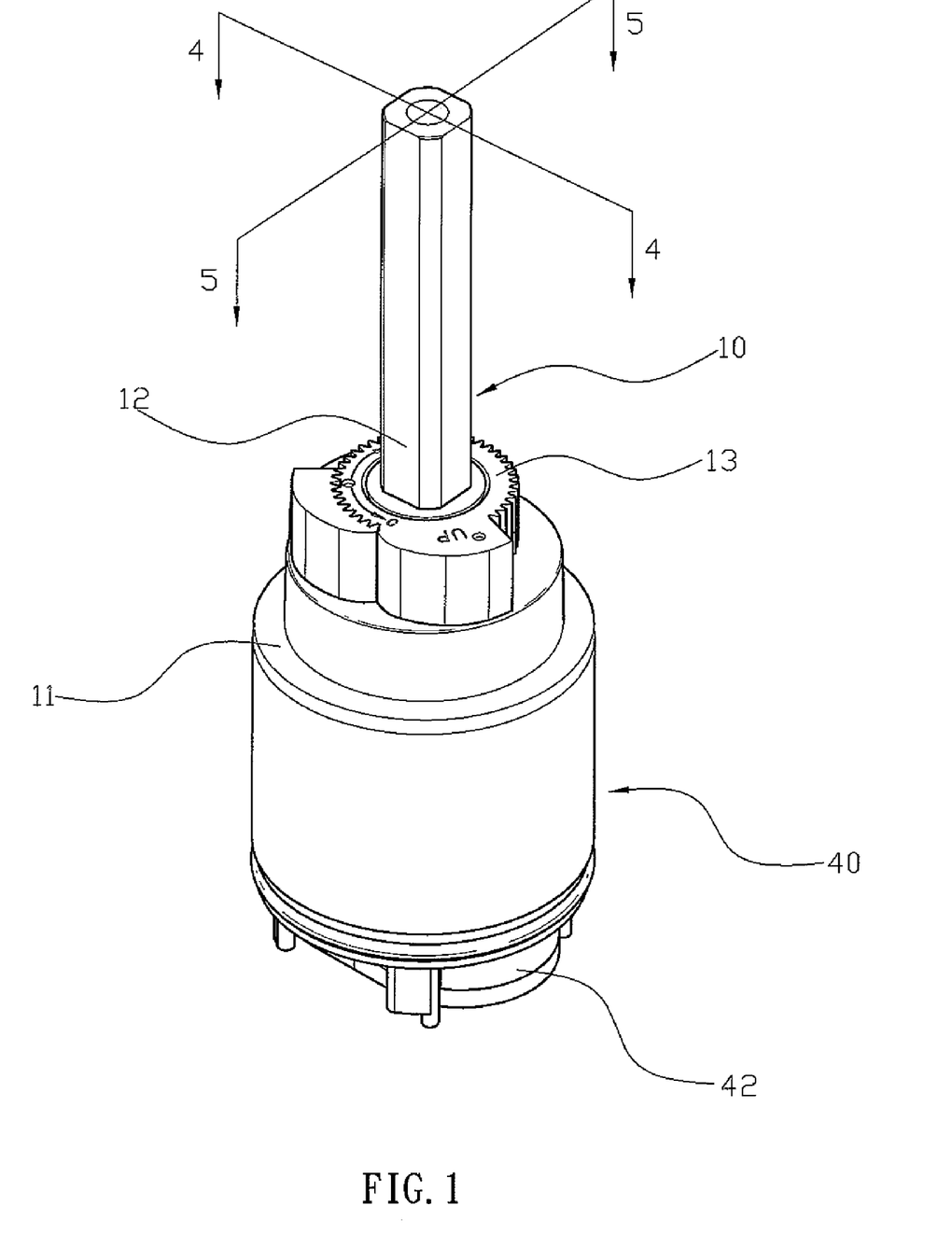
FIG. 1 is a perspective view of a control valve for a faucet in accordance with the preferred embodiment of the present invention.
Figure 2:
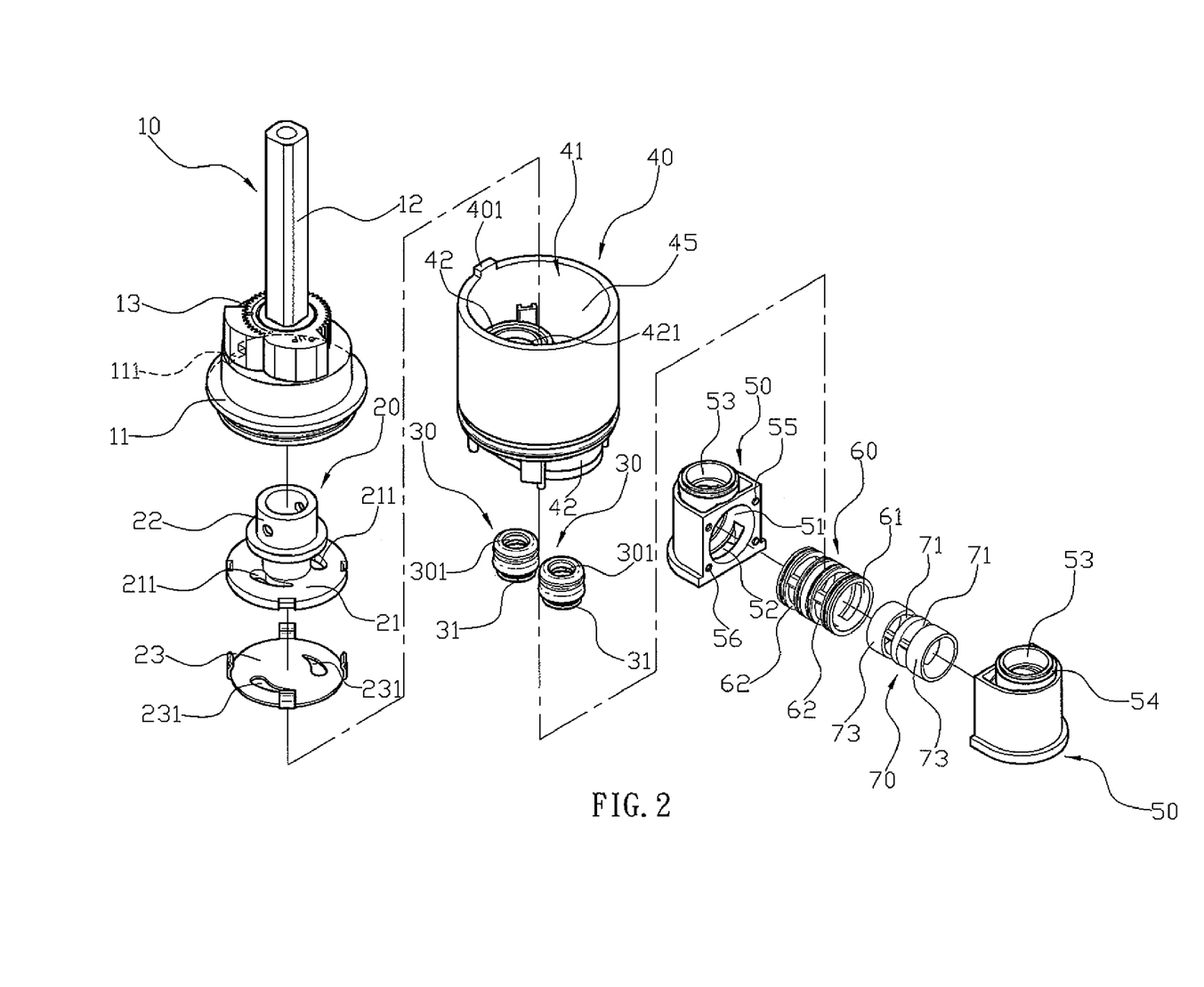
FIG. 2 is an exploded perspective view of the control valve as shown in FIG. 1.
Figure 3:
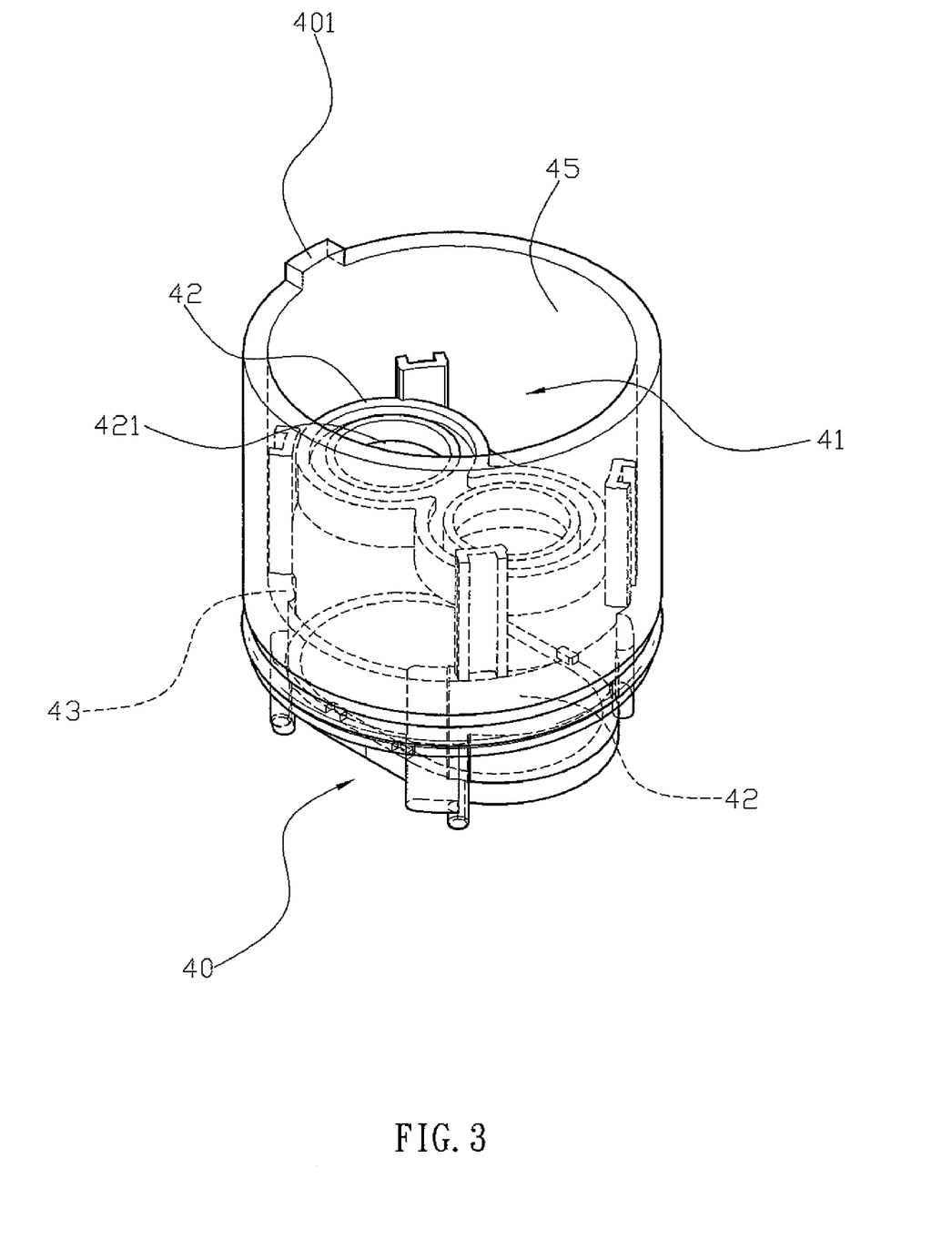
FIG. 3 is a perspective view of a valve housing of the control valve as shown in FIG. 1.
Figure 4:
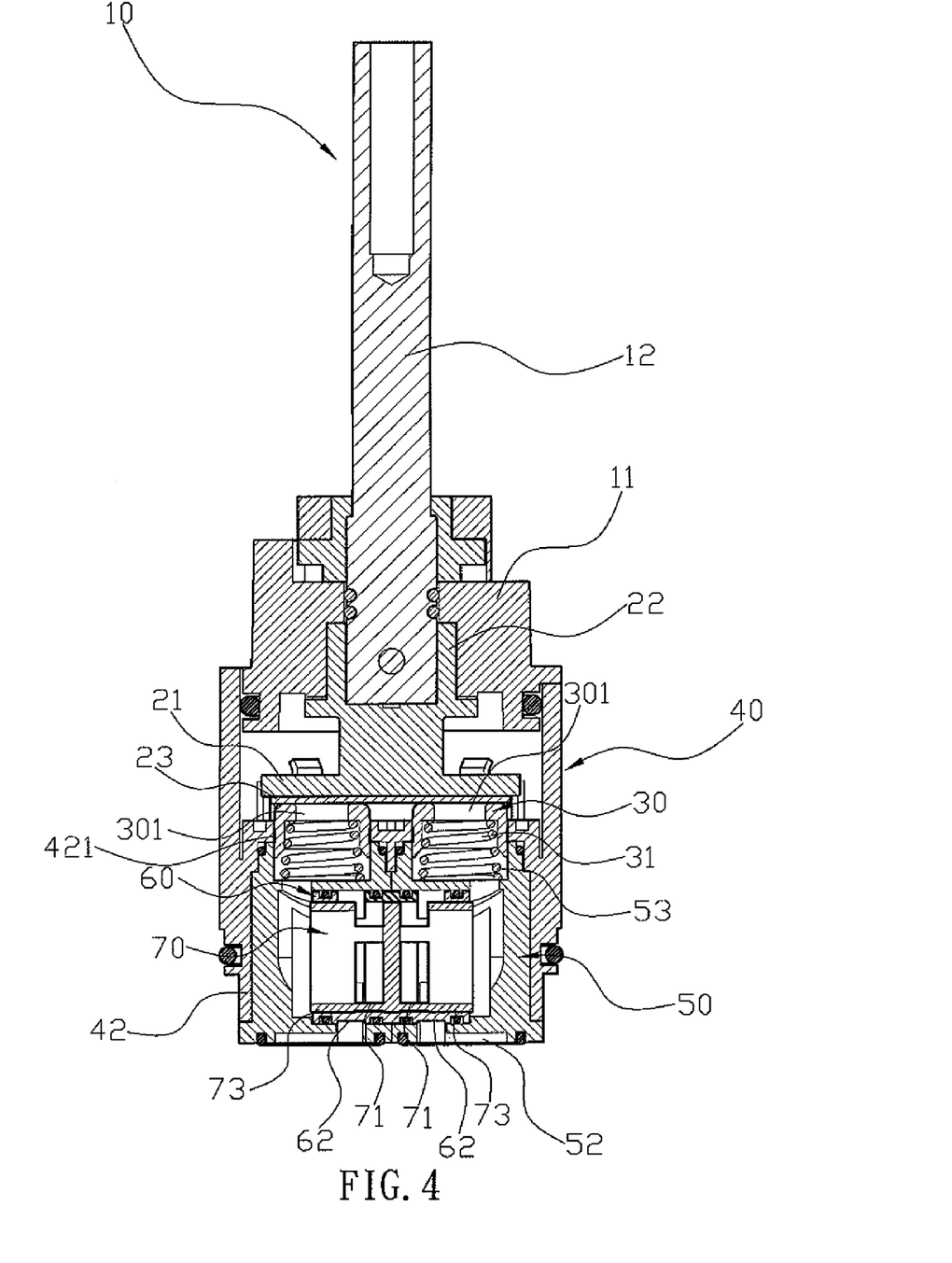
FIG. 4 is a cross-sectional view of the control valve taken along line 4-4 as shown in FIG. 1.
Figure 5:
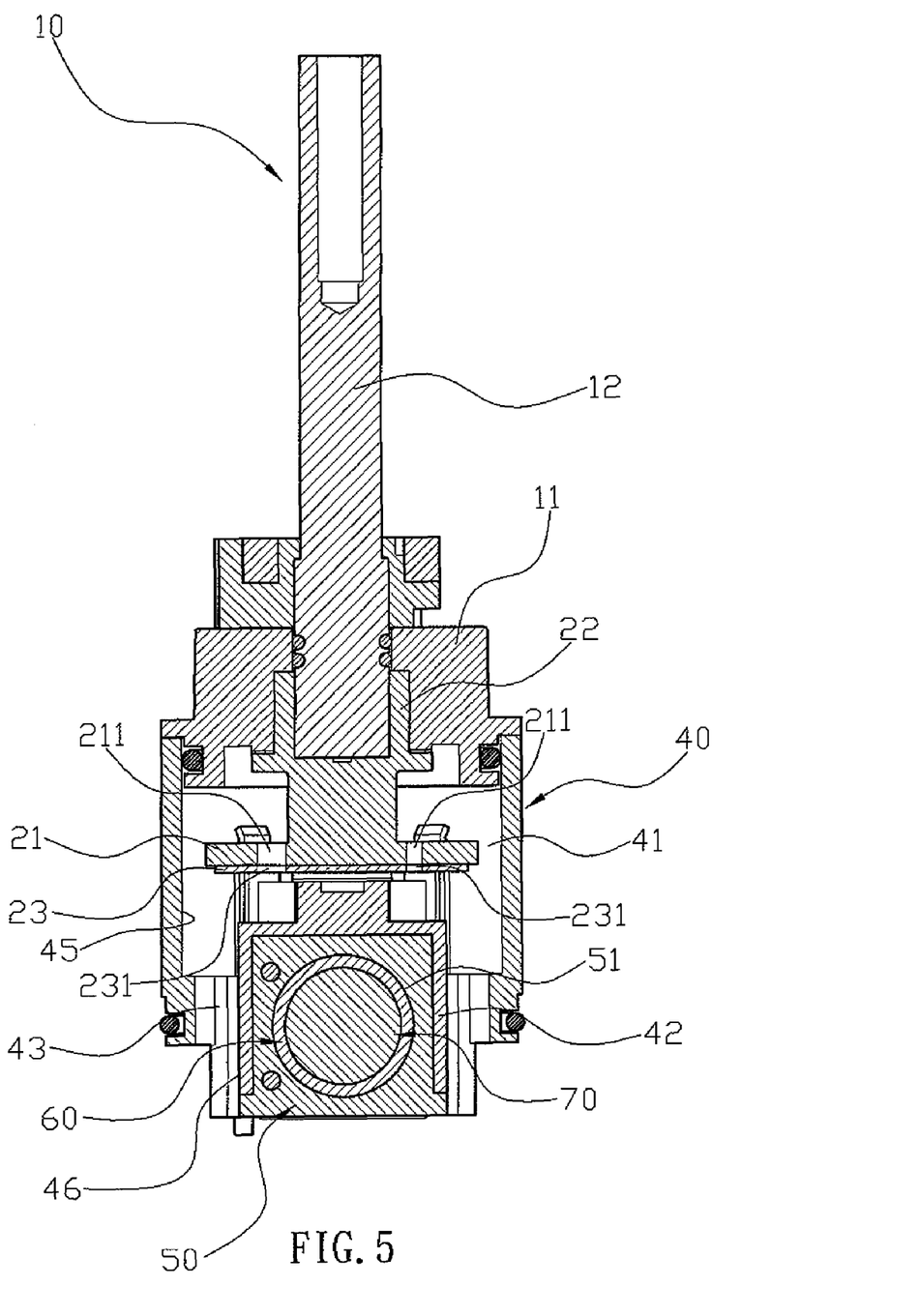
FIG. 5 is a cross-sectional view of the control valve taken along line 5-5 as shown in FIG. 1.
Figure 6:
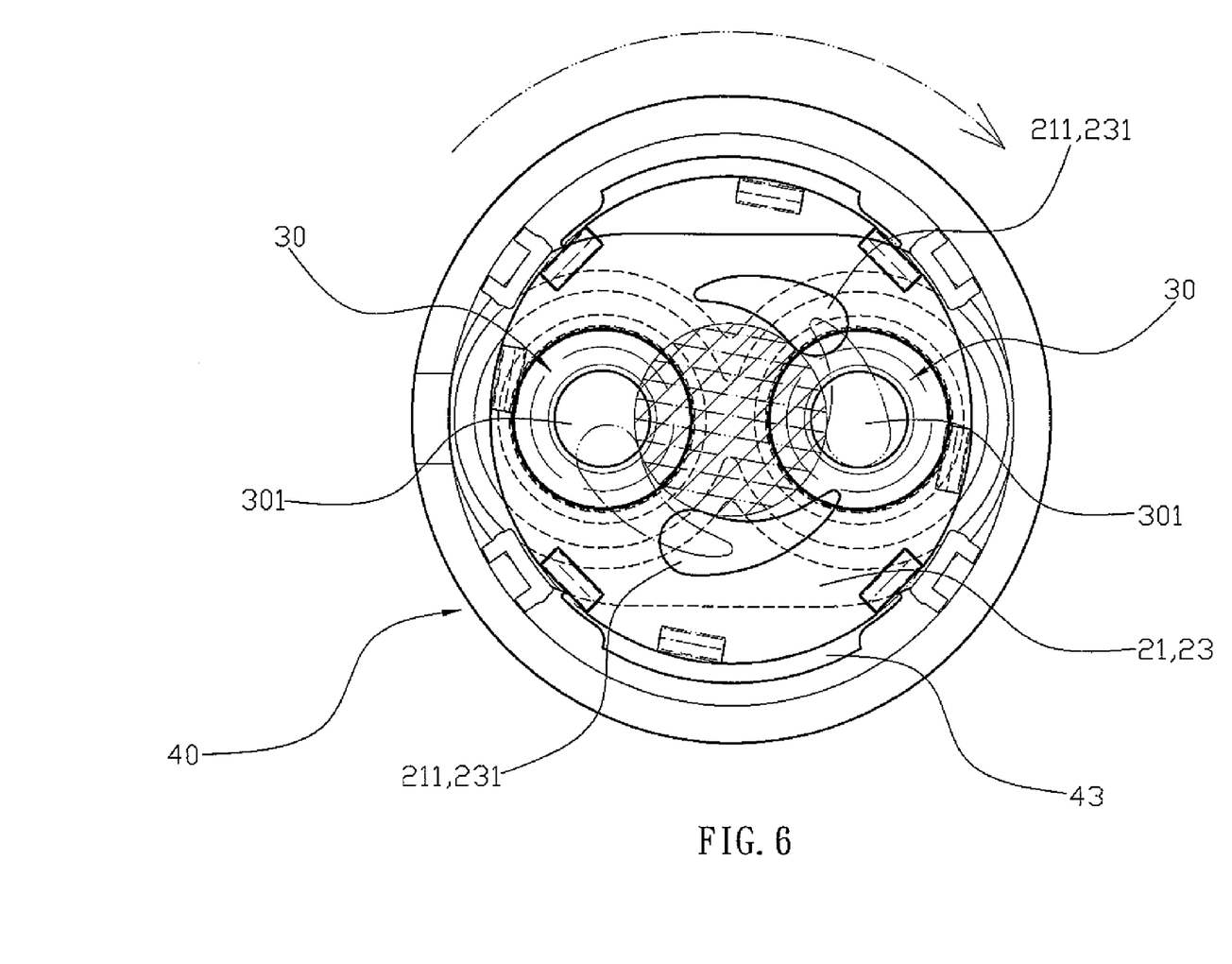
FIG. 6 is a schematic top broken operational view of the control valve as shown in FIG. 1.
Figure 7:
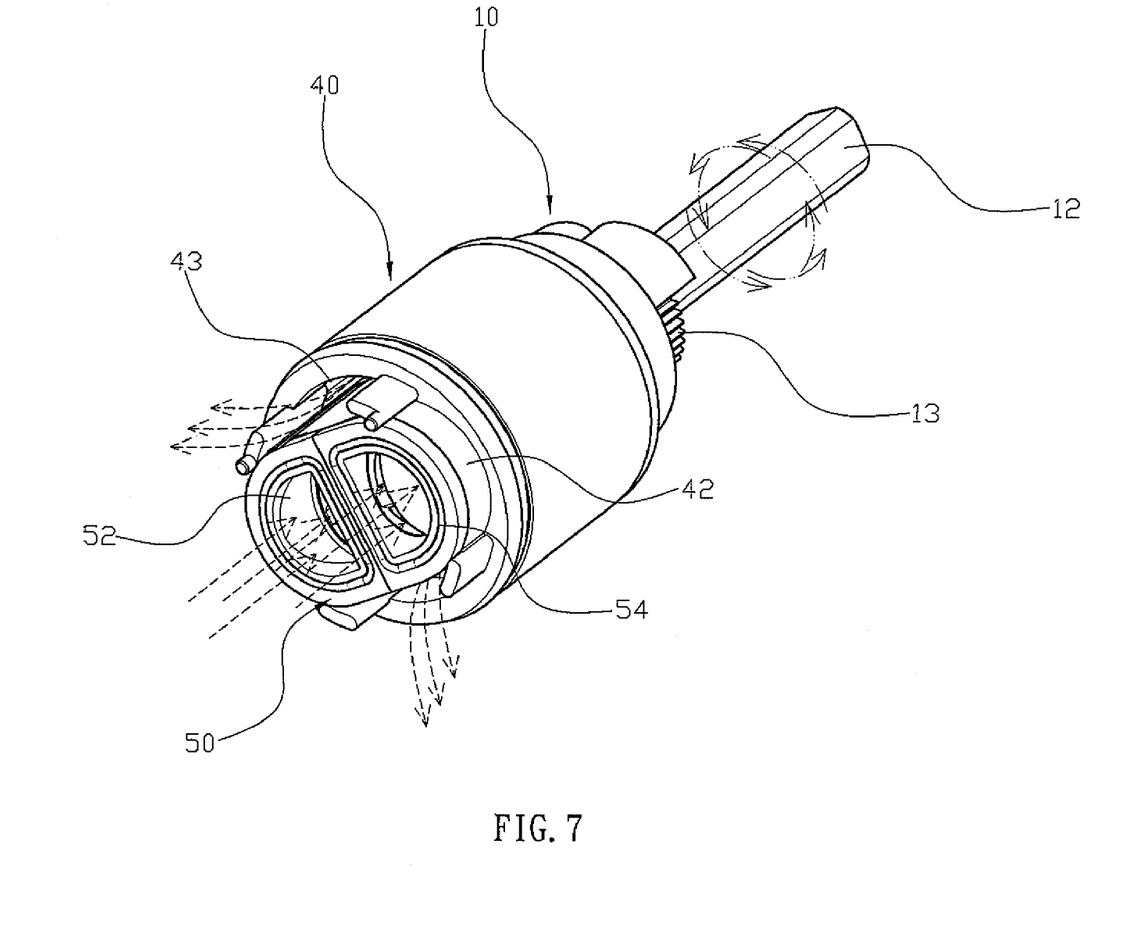
FIG. 7 is a perspective operational view of the control valve as shown in FIG. 1.
Figure 8:
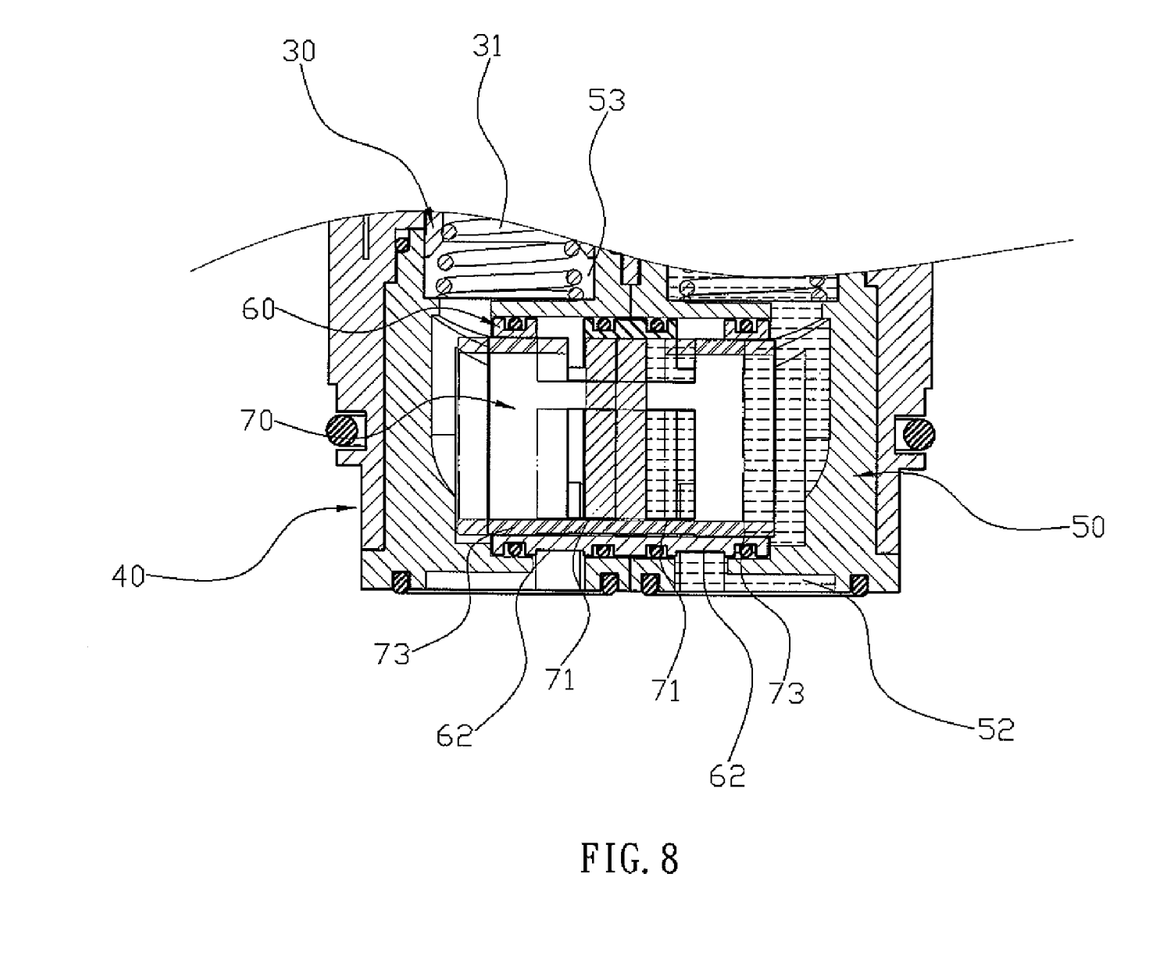
FIG. 8 is a schematic operational view of the control valve as shown in FIG. 4.
Figure 9:
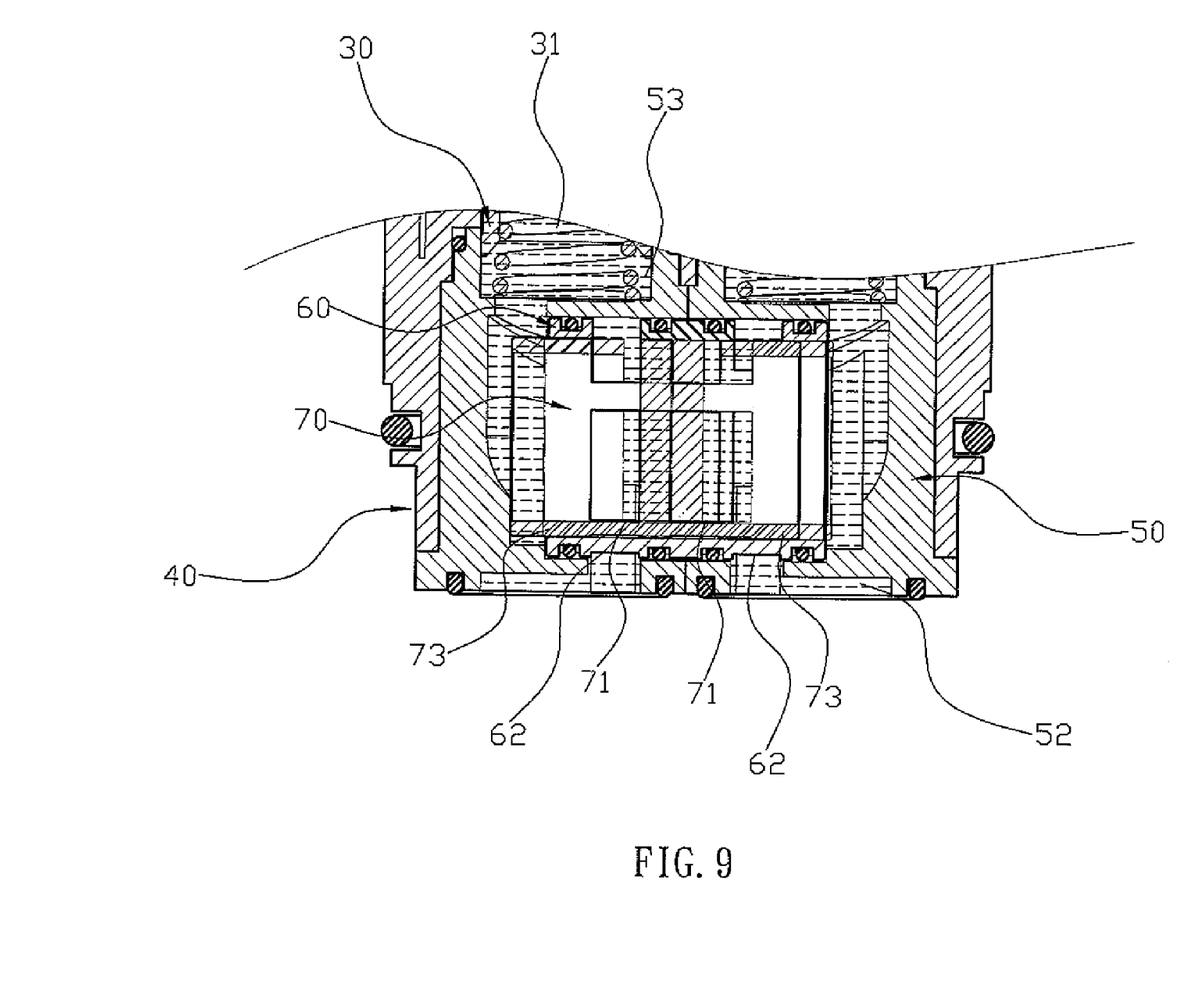
FIG. 9 is a schematic operational view of the control valve as shown in FIG. 8.

On the other hand, referring to FIGS. 8 and 9 with reference to FIGS. 1-7, when the water flow of the water inlet hole 52 of a first one of the two mounting seats 50 is reduced or stops accidentally due to an irregular condition, the water pressure of the water inlet hole 52 of a second one of the two mounting seats 50 will push the movable sleeve 70 toward the first one of the two mounting seats 50, so that the movable sleeve 70 is movable in the fixed sleeve 60 to move one of the two sealing flanges 73 to partially block or entirely interrupt the respective connecting groove 62 of the fixed sleeve 60 as shown in FIG. 8 and to partially block or entirely interrupt the water inlet hole 52 of the second one of the two mounting seats 50 to reduce or stop the water flow of the water inlet hole 52 of the second one of the two mounting seats 50 so as to achieve a water pressure balance effect and to stabilize the temperature of the mixed water.

After the water flow of the water inlet hole 52 of the first one of the two mounting seats 50 is returned to the normal state, the water pressure of the water inlet hole 52 of the first one of the two mounting seats 50 will push the movable sleeve 70 backward toward the second one of the two mounting seats 50, so that the movable sleeve 70 is movable in the fixed sleeve 60 to move the one of the two sealing flanges 73 to detach from the respective connecting groove 62 of the fixed sleeve 60 as shown in FIG. 9 and to return the water flow of the water inlet hole 52 of the second one of the two mounting seats 50 to the normal state.

Accordingly, the movable sleeve 70 is movable in the fixed sleeve 60 to control the water flow rate of the mixed cold and hot water to the optimum value to regulate and stabilize the water pressure automatically so as to provide a pressure balance effect so that the mixed water flowing from the water outlet channel 43 is kept at a constant temperature, thereby providing a comfortable sensation to a user. In addition, the two mounting seats 50, the fixed sleeve 60 and the movable sleeve 70 are fully hidden in the valve housing 40 so that the water faucet directly has a water pressure balance function without having to provide a pressure stabilizer additionally to stabilize the water pressure, thereby greatly decreasing the cost.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A control valve, comprising:
a valve housing having an inner wall provided with a receiving chamber;
a hollow valve seat mounted in the valve housing and having a top wall provided with two mounting holes each connected to the receiving chamber of the valve housing;

two sealing gaskets mounted in the two mounting holes of the valve seat respectively and each having an inner wall provided with a water conduit connected to the receiving chamber of the valve housing;

at least one water outlet channel formed between the inner wall of the valve housing and an outer wall of the valve seat and connected to the receiving chamber of the valve housing;

a rotation plate rotatably mounted in the valve housing and provided with two regulating slots that are movable to align with the water conduits of the two sealing gaskets to connect the water conduits of the two sealing gaskets to the receiving chamber of the valve housing respectively;

a control unit rotatably mounted on the valve housing and secured to the rotation plate to drive and rotate the rotation plate;

two mounting seats mounted in the valve seat and each having a lower end provided with a water inlet hole and an upper end provided with a water outlet hole connected to the water conduit of a respective one of the two sealing gaskets;

a fixed sleeve secured in the two mounting seats and provided with two connecting grooves each connected between the water inlet hole and the water outlet hole of a respective one of the two mounting seats;

a movable sleeve movably mounted in the fixed sleeve and provided with two connecting slots each movable to align with a respective one of the two connecting grooves, and two sealing flanges each movable to align with a respective one of the two connecting grooves to partially block or entirely interrupt a connection between the water inlet hole and the water outlet hole of a respective one of the two mounting seats;

two elastic members each mounted between the water conduit of a respective one of the two sealing gaskets and the water outlet hole of a respective one of the two mounting seats to push the respective sealing gasket toward the rotation plate;

the water conduit of each of the two sealing gaskets has a stepped shape to limit the respective elastic member;

the water outlet hole of each of the mounting seats has a stepped shape to limit the respective elastic member;

each of the two elastic members has an upper end received in the water conduit of the respective sealing gasket and a lower end received in the water outlet hole of the respective mounting seat;

the valve seat partially protrudes outwardly from a lower portion of the receiving chamber of the valve housing.

2. The control valve in accordance with claim 1, wherein the rotation plate has a top provided with a protruding mounting tube located between the two regulating slots;

the control unit includes a valve cover mounted on the top of the valve housing to cover the rotation plate;

a control shank rotatably mounted on the valve cover and having a lower end extending through the valve cover and inserted into the mounting tube to rotate the rotation plate.

3. The control valve in accordance with claim 1, further comprising a resting plate having a top secured on a bottom of the rotation plate to rotate therewith and provided with two mating slots flush and aligning with the two regulating slots of the rotation plate respectively.

4. The control valve in accordance with claim 3, wherein each of the two regulating slots of the rotation plate has a horn shape and has a size increased gradually from one end to the other end of each of the two regulating slots;

the two regulating slots of the rotation plate are directed toward two different directions;

each of the two mating slots of the resting plate has a shape corresponding to that of each of the two regulating slots of the rotation plate.

5. The control valve in accordance with claim 3, wherein the resting plate is located between the rotation plate and the two sealing gaskets;

the resting plate is located between the two sealing gaskets and the receiving chamber of the valve housing and abuts a top of each of the two sealing gaskets to isolate the water conduits of the two sealing gaskets from the receiving chamber of the valve housing and is rotatable relative to each of the two sealing gaskets.

6. The control valve in accordance with claim 2, wherein the valve housing has a top having a periphery provided with a protrusion;

the valve cover of the control unit has a periphery provided with an opening secured on the protrusion of the valve housing to secure the valve cover on the valve housing.

7. The control valve in accordance with claim 1, wherein the two mounting seats are directly received in the valve seat;

the two mounting seats are juxtaposed to each other;

each of the two mounting seats has a periphery provided with a plurality of locking tenons and a plurality of locking bores;

the locking tenons of one of the two mounting seats are inserted into the locking bores of the other one of the two mounting seats so that the two mounting seats are combined together by the locking tenons and the locking bores;

each of the two mounting seats has a side provided with a mounting chamber connected between the water inlet hole and the water outlet hole;

the mounting chambers of the two mounting seats face and are connected to each other;

the fixed sleeve is secured in the mounting chambers of the two mounting seats.

8. The control valve in accordance with claim 1, wherein each of the water inlet hole and the water outlet hole of each of the two mounting seats has an outer wall provided with an O-ring to provide a sealing effect.

9. The control valve in accordance with claim 1, wherein each of the two connecting grooves has an annular shape and is formed in a peripheral wall of the fixed sleeve;

each of the two connecting slots has an annular shape and is formed in a peripheral wall of the movable sleeve;

each of the two sealing flanges has an annular shape and is formed in the peripheral wall of the movable sleeve.

10. The control valve in accordance with claim 1, wherein the fixed sleeve has an inside provided with a receiving hole which is directly connected to the two connecting grooves to receive the movable sleeve;

the movable sleeve is movable in the receiving hole of the fixed sleeve.

11. The control valve in accordance with claim 1, wherein the two connecting slots of the movable sleeve are located between the two sealing flanges.

* * * * *